W. GOWER.
CLIPPING DEVICE.
APPLICATION FILED JULY 29, 1920.
1,386,470.
Patented Aug. 2, 1921.
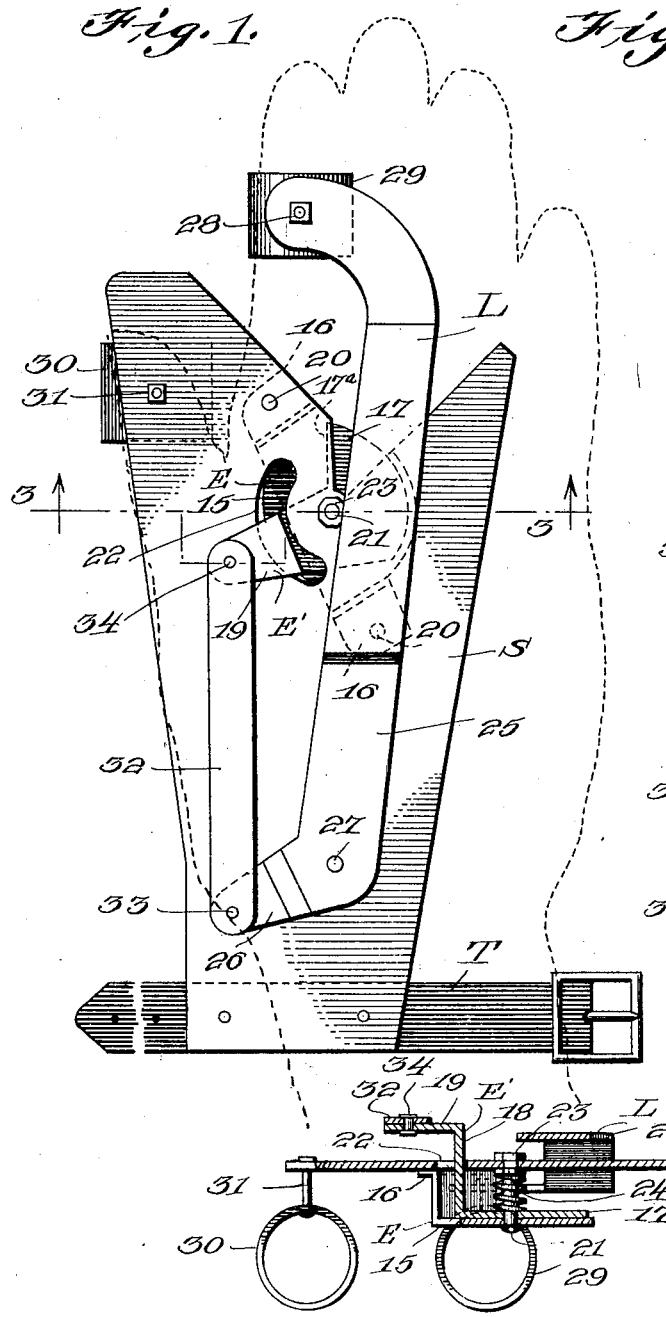
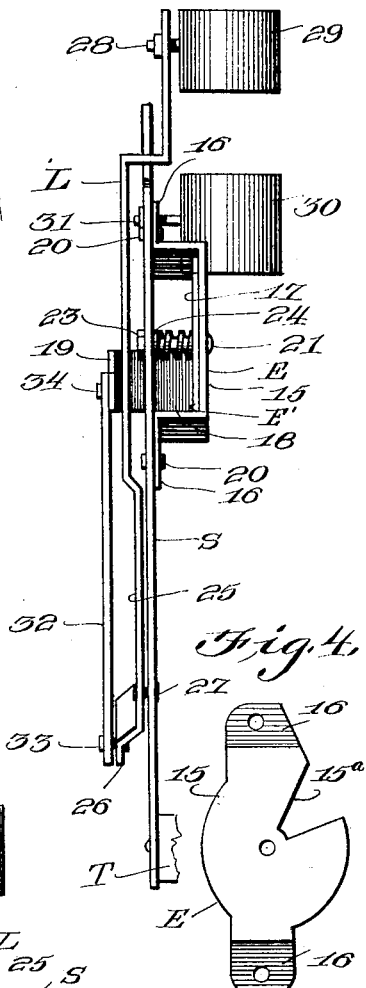
WITNESSES
INVENTOR
Walter Gower,
BY
ATTORNEYS

UNITED STATES PATENT OFFICE.

WALTER GOWER, OF TAMPA, FLORIDA.

CLIPPING DEVICE.

1,386,470.

Specification of Letters Patent.

Patented Aug. 2, 1921.

Application filed July 29, 1920. Serial No. 399,839.

*To all whom it may concern:*

Be it known that I, WALTER GOWER, a citizen of the United States, and a resident of Tampa, in the county of Hillsborough and State of Florida, have invented certain new and useful Improvements in Clipping Devices, of which the following is a specification.

My invention relates to clipping devices and more particularly to hand operated clippers adapted for use in the gathering of fruits, flowers and the like from trees and bushes.

The purpose of my invention is the provision of a clipping device of the above character which is of extremely simple and inexpensive construction, and capable of being operated by one hand.

I will describe one form of clipping device embodying my invention and will then point out the novel features thereof in claims.

In the accompanying drawings:

Figure 1 is a view showing in front elevation one form of clipping device embodying my invention.

Fig. 2 is a view showing in side elevation the device shown in Fig. 1.

Fig. 3 is a transverse sectional view taken on the line 3—3 of Fig. 1.

Fig. 4 is an enlarged detail view showing in side elevation the stationary cutting element shown in the preceding views.

Similar reference characters refer to similar parts in each of the several views.

Referring specifically to the drawings and particularly to Fig. 1, S designates a supporting plate of suitable dimensions to permit of its being readily moved and carried by hand. The plate S is tapered in width, and carries at its lower inner end a strip T designed for the purpose of attaching the plate to the wrist and thereby supporting the clipping device as a unit upon the hand. The upper or outer end of the plate S is provided with a substantially V-shaped recess, the converging edges of which serve to guide the fruit or flower stems into the path of the cutting elements. The cutting elements are designated generally at E and E', the stationary cutting element E being of the form shown in Fig. 4 and comprising a disk portion 15 and offset securing arms 16. The disk portion 15 is formed with a V-shaped recess, one wall of the recess being beveled to provide a cutting edge $15^a$. The movable cutting element E' is of the form illustrated in Fig. 1 and comprises a head 17 having one edge thereof beveled to provide a cutting edge $17^a$. Formed integral with the head 17 and offset therefrom by an extension 18 is an arm 19.

In the applied position of the stationary cutting element E, the arms 16 are secured to the plate S by means of rivets 20 and in such manner that the recess of the disk 15 registers with the smaller end of the plate S whereby the cutting edge $15^a$ is disposed at a point opposite to one edge of the plate recess. Because of the fact that the securing arms 16 are offset with respect to the disk 15, it will be clear that in the applied position of the stationary cutting element, the cutting edge $15^a$ is spaced from the plate S. Arranged between the disk 15 and the plate S is the movable cutting element E', such element being supported for oscillatory movement upon a pivot pin 21 which extends through the plate S, the head 17, and the disk 15. As shown in Figs. 1 and 3, the extension 18 extends through a slot 22 formed in the plate S so that the arm 19 is disposed below the opposite side of the plate S from that of the head 17.

As illustrated to advantage in Figs. 2 and 3, the pin 21 is in the form of a plate, its threaded end extending through the plate S and confined therein by a nut 23. Surrounding the shank of the bolt at a point between the plate S and the head 17 of the movable cutting element E' is a coiled expansible spring 24 which is designed for the purpose of biasing or urging the movable cutting element into contact with the stationary cutting element thereby causing the cutting edge $17^a$ to occupy a coacting position with respect to the cutting edge $15^a$ irrespective of the position of the head 17.

For actuating the movable cutting element E', I provide a lever designated generally at L and comprising a relatively long arm 25 and a short arm 26 disposed at an obtuse angle to the arm 25 as clearly shown in Fig. 1. The lever L is fulcrumed upon the plate at the point indicated at 27, and as shown in Fig. 2 the lever is bent laterally in one direction to offset the arm 26 and in another direction to offset the upper end of the arm 25 and to thus dispose the latter at the rear or inner side of the plate S. The upper end of the arm 25 carries a bolt 28 upon which is pivotally supported a ring 29. A similar ring 30 is pivotally supported upon a bolt 31 secured to the plate S at a point below the ring 29, the latter ring being adapted to receive the forefinger of the hand while the former ring receives the thumb.

The lever L is operatively connected to the movable cutting element E' through the medium of a link 32 which is pivotally connected to the free end of the arm 26 as indicated at 33, and to the free end of the arm 19 as indicated at 34.

In operation, the clipping device is associated with the hand in the manner shown in Fig. 1, the strap embracing the wrist and the rings 29 and 30 receiving the forefinger and thumb, respectively. When clipping fruit or flowers, the device is applied so that the stems of the fruit or flowers are inserted into the apex of the V-shaped recess of the plate S, and between the cutting edges of the cutting elements E and E', it being understood that the cutting element E' is moved to non-spanning position with relation to the recess of the plate. The stems having been properly positioned between the cutting elements, it will be clear that my movement of the thumb and forefinger, a rocking of the lever L about the pivot 27 as a center is effected, and that such movement causes a rocking of the movable cutting element toward the cutting edge of the stationary cutting element so that the cutting edges of the two engage and clip the stem or stems. It will be understood that to return the movable cutting element to its normal position, it is only necessary to actuate the fingers so as to rock the lever L in the opposite direction, thus the device is set for a second clipping operation.

From the foregoing description, taken in conjunction with the accompanying drawings, it will be manifest that I have provided a clipping device which is readily applicable to the hand of an operator and is capable of being operated by the thumb and forefinger leaving the three fingers and the palm of the hand free to grasp the fruit.

Although I have herein shown and described only one form of clipping device embodying my invention, it is to be understood that various changes and modifications may be made herein without departing from the spirit of the invention and the spirit and scope of the appended claims.

What I claim is:

1. A clipping device of the character described comprising, a supporting plate slotted and having a recess formed in one end thereof, a stationary cutting element secured to the plate adjacent the recess and having a portion thereof spaced from the plate, a movable cutting element pivotally supported upon said plate in a manner to move across said recess, means for urging the movable cutting element into contact with the stationary cutting element, an extension formed on the movable cutting element and extending through said slot, an arm formed on said extension disposed at the opposite side of the plate from the movable element, a lever fulcrumed on said plate and disposed at that side of the plate opposite to said cutting elements, a link operatively connecting said arm and said lever, wrist attaching means carried by the plate, and thumb and finger receiving rings pivotally supported on said plate and lever, respectively.

2. A clipping device of the character described comprising, a supporting plate having a recess formed in one end thereof, a stationary cutting element secured to the plate adjacent the recess and having a portion thereof spaced from the plate, a movable cutting element pivotally supported upon the plate in a manner to move across said recess and disposed at the same side of the plate as the stationary cutting element, and means arranged at the opposite side of the plate from the cutting elements and extending into said recess for actuating the movable cutting element.

3. A clipping device of the character described comprising, a supporting plate having a recess formed in one end thereof, a stationary cutting element arranged at one side of the plate, a movable cutting element pivotally supported on the plate in a manner to move across said recess and to coact with the stationary cutting element, a lever fulcrumed on the plate, said lever being disposed at that side of the plate opposite to said cutting elements and extending to a point in advance of said recess, and means operatively connecting said lever and movable cutting element for actuating the latter when the former is rocked.

WALTER GOWER.